May 7, 1929.  G. C. DAVIS  1,711,923
VALVE
Filed Aug. 26, 1925
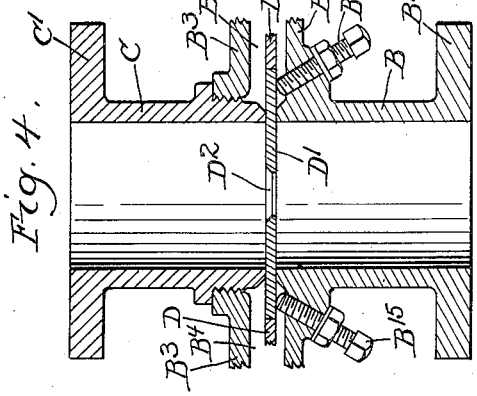
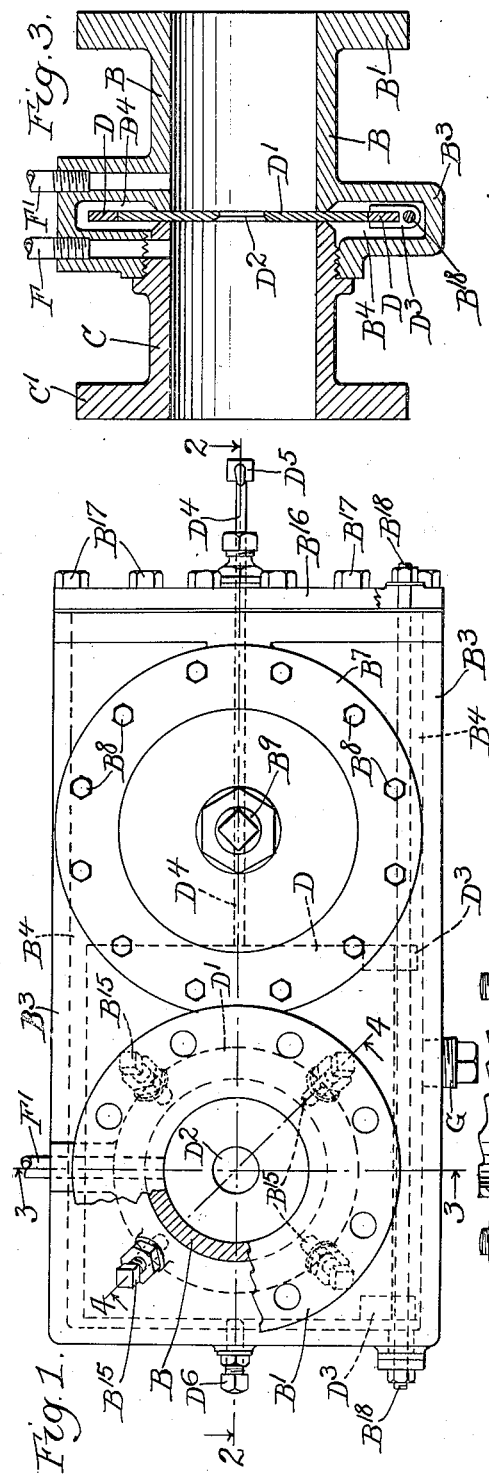
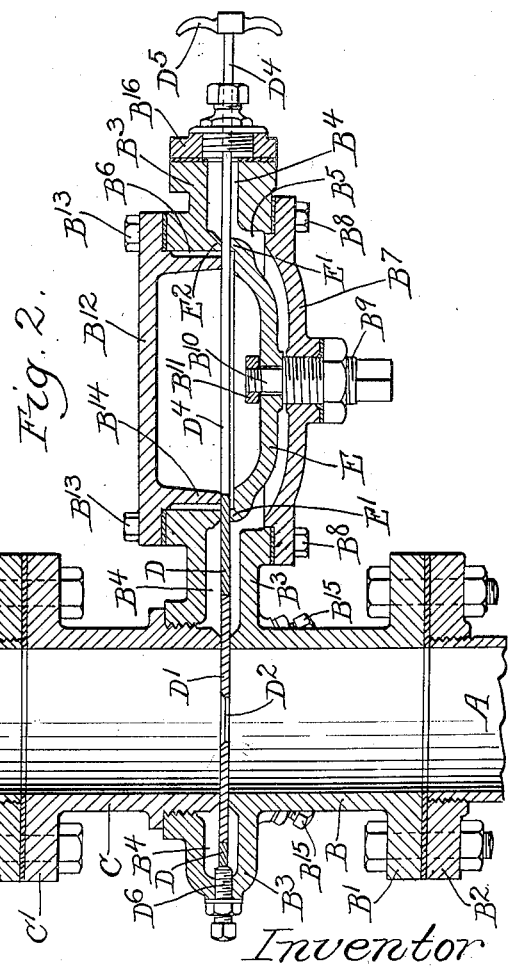
Inventor
George C. Davis
by Parker + Carter.
Attorneys.

Patented May 7, 1929.

1,711,923

UNITED STATES PATENT OFFICE.

GEORGE C. DAVIS, OF CHICAGO, ILLINOIS.

VALVE.

Application filed August 26, 1925. Serial No. 52,506.

This invention relates to an orifice changing valve, and in the form shown herewith particularly to a type of valve in which a removable orifice plate is positioned within the valve. In connection with such valves, fittings, pressure and flow gauges are commonly installed. It is one object of the invention to provide such a valve wherein the orifice plate or member may be changed or removed without removing the fitting and without shutting off the flow through the line in which the valve is applied. Other objects will appear from time to time throughout the specification and claims.

My invention is illustrated more or less diagrammatically in the accompanying drawing wherein:

Figure 1 is a side elevation with parts in section showing the valve housing;

Figure 2 is a horizontal cross section on the line 2—2 of Figure 1;

Figure 3 is a vertical cross section on line 3—3 of Figure 1;

Figure 4 is a cross section on line 4—4 of Figure 1.

Like parts are indicated by like characters throughout.

A is a section of pipe, and $A^1$ is a communicating section. The two are joined to a valve housing formed of the parts B and C.

The part B is provided with a flange $B^1$ to which a collar $B^2$ may be bolted, the collar being fastened to the pipe A. At the end opposite the flange $B^1$, the parts B is provided with a lateral extension $B^3$ which has formed within it a cavity $B^4$ and openings $B^5$ $B^6$. The opening $B^5$ is closed by a removable plate $B^7$ which is removably attached by means of screws $B^8$. The part $B^7$ is provided with a central perforation in which is threaded a screw $B^9$ which carries at its inner end a reduced portion $B^{10}$, having on it a head or nut $B^{11}$. The hole $B^6$ is closed by a plate $B^{12}$ which is held in position by screws $B^{13}$ and is provided with an inwardly extending flange $B^{14}$. $B^{15}$ $B^{15}$ are locking screws positioned in the member B adjacent the lateral extension $B^3$. The open end of the cavity $B^4$ is closed by a plate $B^{16}$, which is held in position by screws $B^{17}$. $B^{18}$ is a rod mounted within the cavity $B^4$ and adapted for a use which will be described below.

The part C is provided with a flange $C^1$ which is joined to a collar $C^2$ on the pipe section $A^1$.

D is a carrier. It is provided with a perforation within which is removably seated an orifice plate $D^1$ having a perforation $D^2$. Fastened to one edge of the carrier D is a pair of perforated members $D^3$. These members are mounted on the guide rod $B^{18}$ and are adapted to slide along it, thus guiding and supporting the carrier D upon the rod $B^{18}$. $D^4$ is the carrier rod. It is attached to the carrier at one end, extends beyond the casing at the other, and at its exposed end carries a handle $D^5$. $D^6$ is a limiting and starting screw mounted in the part $B^3$ and extending into the cavity $B^4$. It serves to position and to limit the movement of the carrier in the left hand direction as shown in Figures 1 and 2. It serves also as a means for initiating the reverse movement of the carrier. Thus when it is desired to move the carrier in the right hand position as shown in Figures 1 and 2, the screw $D^6$ may be screwed inward so as to start the reverse movement.

E is a carrier clamp. It is loosely mounted on the part $B^{10}$ of the screw $B^9$. It is generally cup-shaped as shown and provided with an inwardly extending narrow edge $E^1$ which is generally the same size as the inwardly extending ring $E^2$ formed on the casing part $B^3$ opposite it.

F $F^1$ are gauge connections. They are not shown in full detail nor is the gauge shown because these features form no particular part of the present invention. They are shown merely to indicate that gauges are frequently used in this type of fitting.

G is a removable drain plug which may be removed to permit drainage from the cavity $B^4$ within the casing.

Although I have shown an operative device, still it will be obvious that many changes might be made, in size, shape and arrangement of parts without departing materially from the spirit of my invention; and I wish, therefore, that my showing be taken as in a sense diagrammatic.

The use and operation of my invention are as follows:

In normal operation the parts are as shown in Figures 1 and 2. As there shown the pipe line is horizontal. The orifice plate is vertical extending through it. The parts might, of course, be in any other position but whatever the position of the pipe with relation to the horizontal, the orifice plate extends through it and forms an orifice of smaller diameter than the interior of the pipe.

When the parts are in this position, the locking screws B¹⁵ are screwed tight against the orifice plate and removal or shifting of the parts is prevented.

For many purposes it is necessary to remove the orifice plate either for the purpose of repair or to insert a plate having a different size orifice. When this is to be done, the locking screws B¹⁵ are first loosened. The screw D⁶ is then screwed inward and initiates the withdrawing movement of the carrier and orifice plate. This movement is continued farther by pulling on the handle D⁵ of the carrier rod D⁴, and the movement is continued until the orifice plate is moved wholly out of line with the pipe and lies within the cavity B⁴ within the clamp member E.

In this position the carrier and plate having been removed from the pipe line, the slot which is normally occupied by the carrier or plate on one side of the pipe line, is opened and gas can escape from it into the part of the cavity B⁴ surrounding the carrier clamp but it cannot go further. The screw B⁹ is then tightened and the carrier clamp is forced against the carrier, and thus forces the carrier upward against the inwardly extending ring E². When sufficient pressure has been exerted so that the clamp has forced the carrier against the ring E² and has sealed the two, then the orifice removing portion is opened by removing the plate B¹². The orifice plate can then be removed and escape of gas or other fluid from the assembly is impossible because of the fact that the carrier plate is forced against the ring E² by means of the clamp E. Another orifice plate is replaced within the carrier, the plate B¹² is again seated and secured in position and the screw B⁹ is slightly loosened. Since as shown the portion B¹⁰ of the screw B⁹ fits loosely within the perforation through the carrier clamp E, gas or other fluid passes at once into the interior of the clamp E, that is into the space between the clamp E and the orifice plate, and thus pressure is equalized on both sides of the carrier clamp E. Then the carrier clamp may be further loosened by the further movement of the screw B⁹. The carrier and orifice plate are then moved back to the left as shown in Figures 1 and 2 until the orifice plate is again in position in the pipe line. The locking screws B¹⁵ are then again tightened and the parts are in position for use.

Thus an apparatus is provided whereby the orifice plate can be removed or repaired without interrupting the flow through the pipe line and without in any way detaching any parts from the pipe line, the valve connections or the gauges.

I claim:

1. In combination with a housing, an orifice member within the same, means to permit removal of said member including a housing normally unoccupied and having a chamber adapted to communicate with said first housing and adapted to receive said orifice member, said second housing formed with an opening through which said member may be removed, and a carrier for said orifice member mounted for movement within said housings, and a cap member within said second housing adapted to cooperate in closing said opening for the removal of the orifice member, said cap member adapted to engage the carrier in sealing contact, said cap mounted on a screw whereby it may be moved by the movement of said screw, the screw being provided with an extension and the cap with a perforation, the extension lying within the perforation and being smaller than the same to permit leakage through such perforation when the screw is not screwed tightly into place.

2. In combination with a housing, an orifice member within the same, means to permit removal of said member including a housing having a chamber adapted to communicate with said first housing and adapted to receive said orifice member, said second housing formed with an opening through which said member may be removed, and a carrier for said orifice member mounted for movement within said housings, and a cap member within said second housing adapted to cooperate in closing said opening for the removal of the orifice member, said cap member adapted to engage the carrier in sealing contact, and an inwardly projecting annulus in said second housing against which said cap forces said carrier whereby the sealing contact is completed, said cap mounted on a screw whereby it may be moved by the movement of said screw, the screw being provided with an extension, and the cap with a perforation, the extension lying within the perforation and being smaller than the same to permit leakage through such perforation when the screw is not screwed tightly into place.

3. In combination with a housing, an orifice member within the same, means to permit removal of said member, including a housing having a chamber adapted to communicate with said first housing and adapted to receive said orifice member, said second housing formed with an opening through which said member may be removed, and a cap member adapted to cooperate in closing said opening for removal of said member, said cap mounted on a screw whereby it may be moved by the movement of said screw, the screw being provided with an extension and the cap with a perforation, the extension lying within the perforation and being smaller than the same to permit leakage through such perforation when the screw is not screwed tightly into place.

Signed at Chicago, county of Cook, and State of Illinois, this 20th day of August, 1925.

GEORGE C. DAVIS.